Sept. 30, 1958  L. J. SPAIDE  2,854,261
COUPLING
Filed Jan. 23, 1956  3 Sheets-Sheet 1
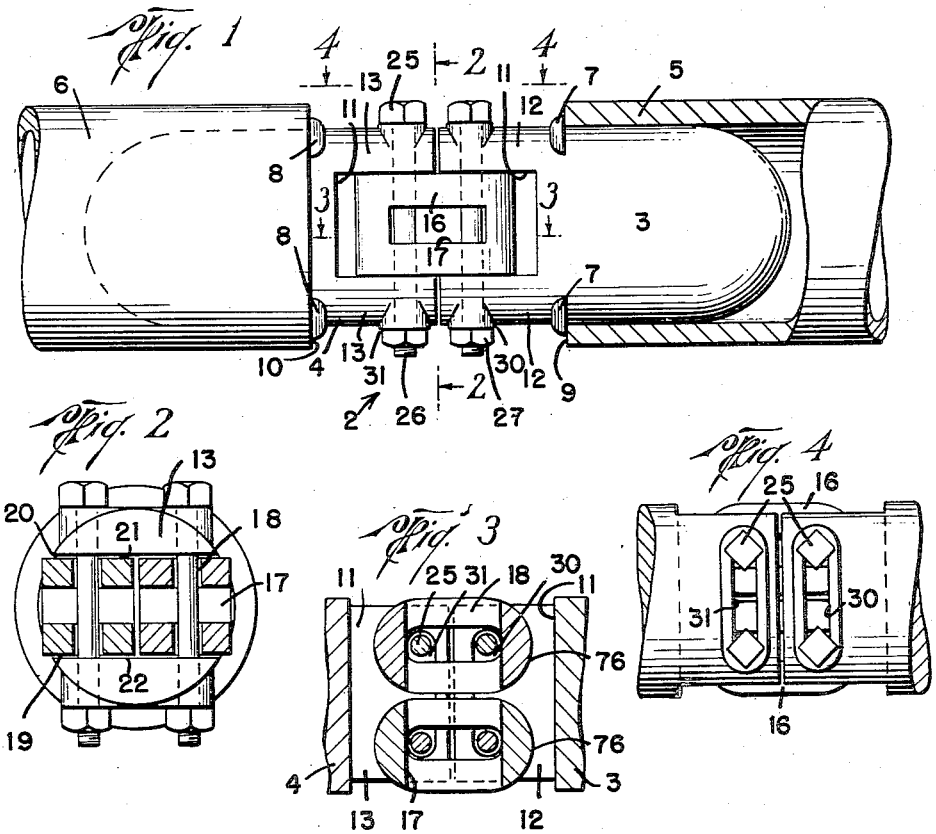
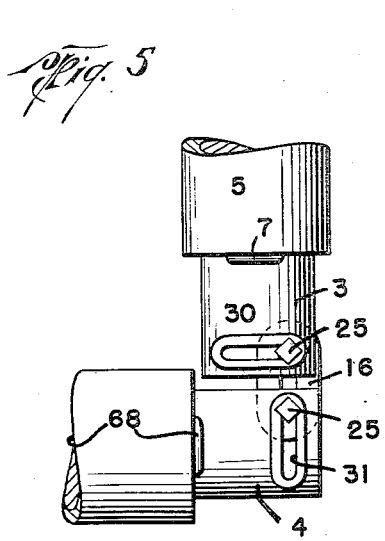
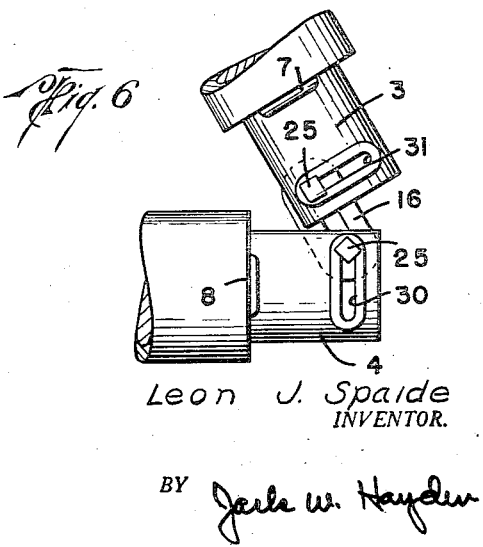
Leon J. Spaide
INVENTOR.
BY Jack W. Hayden
ATTORNEY Sept. 30, 1958 L. J. SPAIDE 2,854,261
COUPLING
Filed Jan. 23, 1956 3 Sheets-Sheet 2
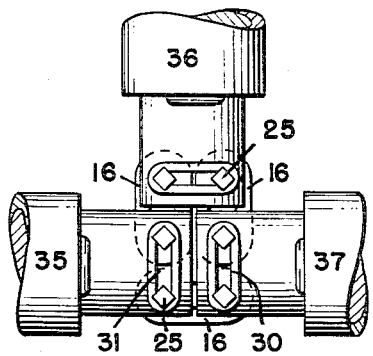
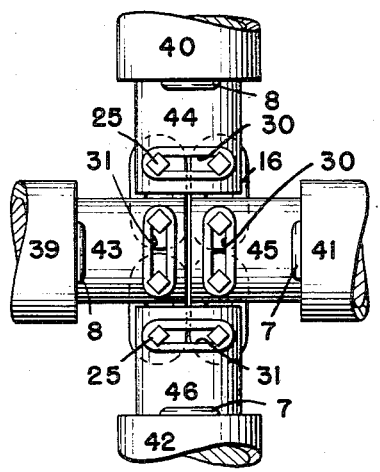
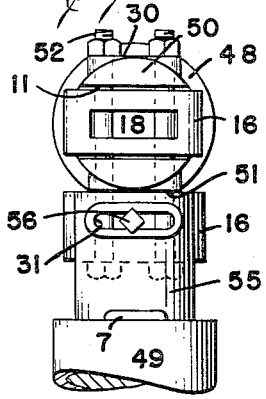
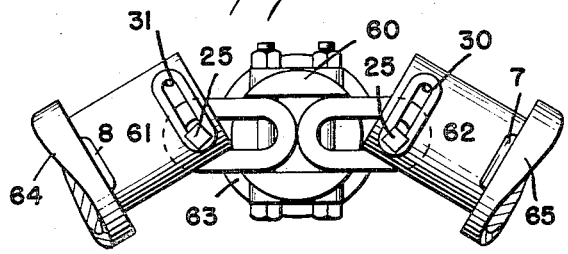
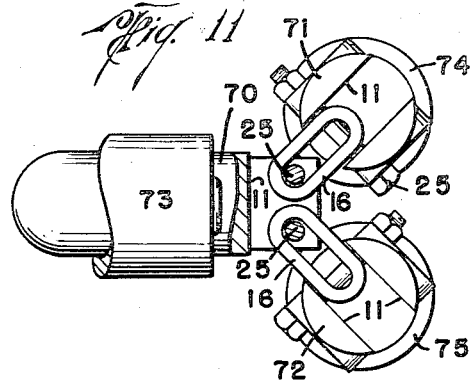
Leon J. Spaide
INVENTOR.
BY Jackw. Hayden
ATTORNEY Sept. 30, 1958     L. J. SPAIDE     2,854,261
COUPLING
Filed Jan. 23, 1956     3 Sheets-Sheet 3
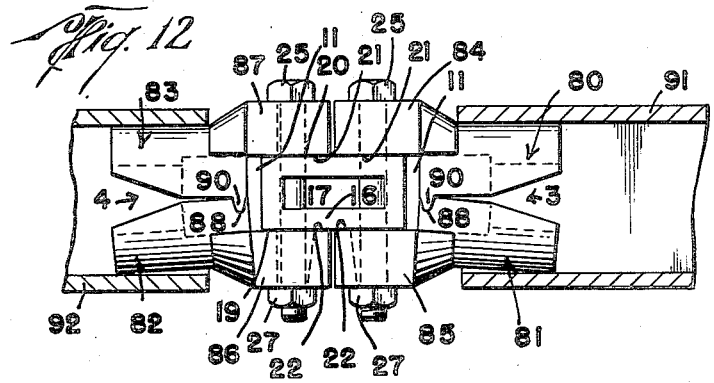
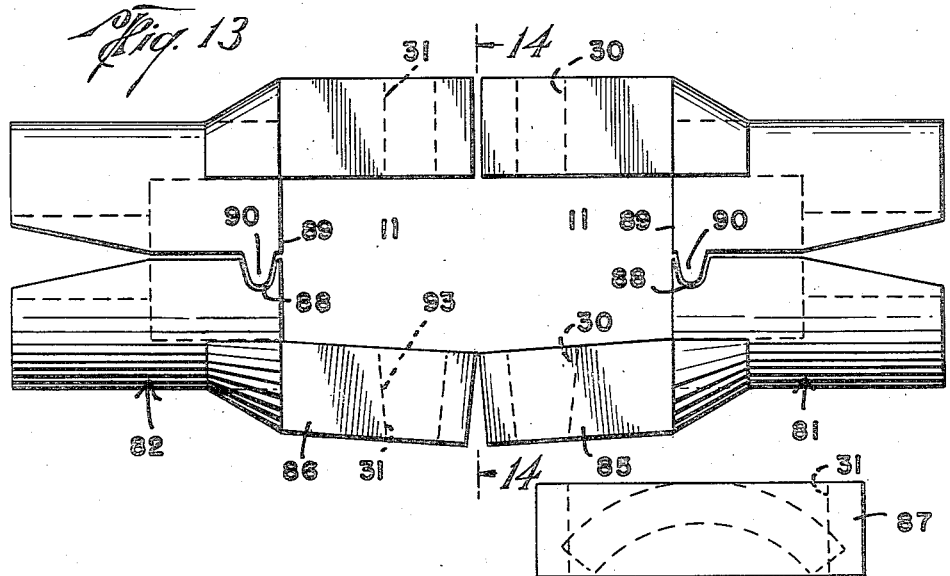
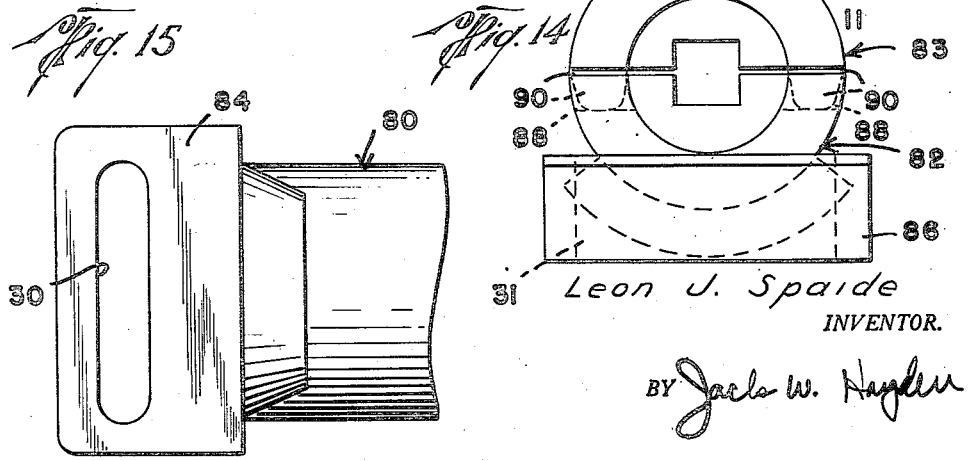
Leon J. Spaide
INVENTOR.
BY *Jacks W. Hayden*
ATTORNEY

United States Patent Office 2,854,261
Patented Sept. 30, 1958

2,854,261

COUPLING

Leon J. Spaide, Houston, Tex.

Application January 23, 1956, Serial No. 560,629

1 Claim. (Cl. 287—2)

The present invention relates to a coupling for fitting between adjacent members and positioning such members in any predetermined or desired angular relationship.

An object of the present invention is to provide a coupling of a relatively simple yet sturdy construction which may be easily manipulated for connecting members engaged therewith in any desired or predetermined angular relationship.

Still another object of the invention is to provide a coupling including a pair of members, a connector for engaging said members together in a desired angular relationship and means for detachably locking the connector with each of such members for maintaining the coupling in a predetermined angular position.

Yet a further object of the invention is to provide a coupling including members which have spaced ears thereon forming a U-shaped slot, the slots of the adjacent members cooperating to form a recess for receiving a connector between such members and means fitting between said spaced ears and engaging the connector in each member for positioning the members of the coupling together.

Still another object of the invention is to provide a coupling including a pair of members having a cut-away portion therein for receiving a connector, said connector being shaped so as to accommodate relative movement to position the members in a desired angular relationship, detachable securing means engaging the members with the connector for positioning such members in a predetermined angular relation.

Still another object of the invention is to provide a coupling for fitting in adjacent members, which members are adapted to be positioned in a predetermined angular relationship relative to each other, said coupling including paired portions for engaging in each of the members which are to be positioned relative to each other, said paired portions being expansible to hold said members in which they are engaged.

Still another object of the invention is to provide a coupling formed of paired mating portions, which portions are adapted to be engaged in members for positioning the members in a predetermined angular relationship, one portion of each pair having a groove and the opposite portion of each pair having a projection for fitting in the groove whereby the paired portions may be positioned together so that as a securing means is engaged with the paired portions for holding them together, they are expanded to wedge in the member in which they are positioned.

Still another object of the invention is to provide a coupling for fitting in adjacent members, said coupling being formed of paired portions adapted to be connected together, and such coupling having an arrangement whereby when said paired portions are secured together, the portions expand to tightly wedge into position in the members they are coupling together.

Yet a further object of the invention is to provide a coupling including paired portions which have projections thereon forming a U-shaped slot at the front of each set of paired portions with a groove adjacent the base of the U-slot in one of the portions of each pair and a projection in the other portion of each pair for fitting in the groove to pivotally connect the portions of each pair together, there being a connector for fitting in the U-shaped slot, and securing means for engaging the connector and the projections together for positioning the paired portions together to form the coupling, said securing means acting to expand the portions so as to securely urge them into position in members in which they are engaged for coupling the members together.

Other objects and advantages of the invention will become more readily apparent from a consideration of the following description and drawings wherein:

Fig. 1 is a side view, partly in section, showing the coupling members connected together and positioned in members which are to be maintained in a predetermined relationship by such coupling;

Fig. 2 is a vertical sectional view on the line 2—2 of Fig. 1 showing the structural details of the connector;

Fig. 3 is a horizontal sectional view on the line 3—3 of Fig. 1 further illustrating the structural details of the connector members;

Fig. 4 is a plan view on the line 4—4 of Fig. 1, illustrating the laterally extending grooves in the ears of the coupling members;

Fig. 5 illustrates the coupling with the coupling members and connector moved to another position;

Fig. 6 is a side view illustrating the coupling in still another position;

Fig. 7 illustrates another angular position of the coupling;

Fig. 8 illustrates a cross formed by the coupling;

Fig. 9 is another view illustrating another use of the coupling;

Fig. 10 is a view illustrating still another use of the coupling; ;

Fig. 11 is a view illustrating still another position of the coupling;

Fig. 12 is a side view partly in section showing an alternate modification of the coupling, assembled and positioned in members, which members are to be maintained in a predetermined relationship by the coupling;

Fig. 13 is a side view of the coupling of Fig. 12 showing in more detail the component parts thereof;

Fig. 14 is a view on the line 14—14 of Fig. 13 illustrating structural details of the component parts of one coupling member; and Fig. 15 is a partial plan view of one of the coupling members showing the slot therein for receiving a bolt means.

Several positions of the coupling are illustrated in the drawings, however, it should be understood that such positions are merely illustrative and are not to serve as a limitation on the manner in which the present invention may be used. Many other combinations or relationships between the coupling members may be established without departing from the scope of the present invention.

In Fig. 1 the coupling is illustrated generally by the numeral 2 and is shown as including coupling members 3 and 4. Each of such coupling members are of a suitable size whereby they may be readily received within the members illustrated at 5 and 6 so as to position such members in a desired relationship relative to each other. Projections 7 and 8 are provided on each of the coupling members 3 and 4 respectively so as to abut the ends 9 and 10 of the members 5 and 6 to position the coupling relative to each of such members.

Each of the members 3 and 4 are provided with the cut-out portion 11 which cut-out portion is formed by the spaced ears 12 and 13 on each of the members 3 and 4 respectively. The recess or cut-out portion 11 in each of the members 3 and 4 extends longitudinally of such members and inwardly a sufficient distance so as to provide a means of accommodating or receiving the connector 16 whereby the coupling members 3 and 4 may be connected together.

The coupling member 16 fits within the recess 11 between the spaced ears 12 and 13 respectively and is provided with slots 17 and 18 which extend longitudinally of the connector 16 and intersect along the longitudinal axis of the connector. As illustrated in the drawings, the connector 16 may be of a general rectangular configuration whereby its surfaces 19 and 20 fit adjacent the confronting parallel surfaces 21 and 22 formed by each pair of ears 12 and 13 respectively.

In order to lock the coupling members 3 and 4 and the connector 16 extending therebetween together, suitable means may be provided in the form of the bolt 25 having the threaded area 26 on one end thereof and a length greater than the width or the diameter of the members 3 or 4, whereby such threaded area may be engaged by the nut 27. Laterally extending slots 30 and 31 are provided in the paired ears 12 and 13 respectively for receiving the locking means, illustrated in the drawings as being in the form of the bolts 25 which extend through the laterally extending slots 30 and 31 in the ears 12 and 13 and the longitudinally extending slot 18 of the connector 16.

In Fig. 1 of the drawings, the coupling members 3 and 4 are illustrated in one position wherein they are axially aligned and locked in such alignment by means of the bolts 25, nuts 27 and connector 16 so as to maintain the members 5 and 6 engaged with each of such coupling members 3 and 4 in axial or longitudinal alignment.

Fig. 5 illustrates still another position of the coupling wherein it may be desired to maintain the members 5 and 6 at substantially a right angle with respect to each other. The coupling member 3 and coupling member 4 have been connected together in such desired angular relationship by means of the connector 16 fitting within the U-shaped cut-out portion 11 on each of such members. The locking means 25 may then be positioned through the ears 12 and 13 of each member and the connector 16 so as to lock or fix the angular relationship of the members 3 and 4.

Fig. 6 illustrates still another angular relationship to which the coupling may be adjusted, wherein the members 3 and 4 are locked together as previously described by means of the connector 16.

Fig. 7 illustrates a form of the coupling wherein three coupling members are provided so as to position the members 35, 36 and 37 in a desired relationship. It should be apparent that any suitable number of connectors 16 may be used to position the coupling members relative to each other, and in the form of the invention illustrated in Fig. 7 three of such connectors are shown as fitting in the cut-out portion 11 of the ends of the coupling members.

In Fig. 8, the present invention is illustrated as modified for accommodating a four way connection or for positioning the four members 39, 40, 41 and 42 relative to each other. It is to be noted that in this particular ararngement, four of the connectors 16 are used to maintain the coupling members designated in Fig. 8 as 43, 44, 45 and 46 in a predetermined angular relationship so as to obtain the desired relative positioning of the members 39, 40, 41 and 42 engaged with the coupling members respectively.

In Fig. 9 a different manner of positioning members 48 and 49 in a right angular relationship is illustrated. The coupling member 50 is shown as having the connector 16 extending laterally of the cut-out 11 and an additional connector 16 in parallel relation to the first connector, but positioned on the outer lower surface 51 of the member 50. Elongated bolts 52 extend through the coupling member 50 as well as both connectors 16. The coupling member 55 may then be positioned on the connector 16 by fitting such connector within the cut-out portion 11 of the coupling member 55 and connecting the connector 16 and coupling member 55 together by means of the bolt 56. It can be seen from Fig. 9 that any of a number of combinations of the coupling members and connectors may be utilized to provide the desired angular relationship between the members connected to the coupling.

In Fig. 10 still another arrangement of the coupling is illustrated. In such illustration the coupling member 60 is connected with the coupling members 61 and 62 so as to position the members 63, 64 and 65 in a desired relationship.

Still another possible combination is illustrated in Fig. 11 of the drawings wherein the coupling member 70 is connected to the coupling members 71 and 72 so as to position the members 73, 74 and 75 in a desired angular relationship.

In the modification of the invention illustrated in Fig. 12 the coupling members 3 and 4 are illustrated as being formed by the paired portions 80 and 81, 82 and 83 respectively. Each portion 80, 81, 82 and 83 includes a projection or ear 84, 85, 86 and 87 respectively, with the projections of each pair of portions cooperating to form a cut-out or recess 11 at the front of each set of paired projections 84, 85 and 86, 87 respectively. The recess or cut-out portion 11 in each of the members 3 and 4 extends longitudinally of such members and is of sufficient distance so as to provide a means of accommodating or receiving the connector 16 whereby the coupling members 3 and 4 may be connected together as well as connecting the paired portions 80 and 81 and the paired portions 82 and 83 together.

As previously described, the connector member 16 fits within the recess 11 between the projections 84, 85, 86 and 87 and is provided with slots 17 and 18 which extend longitudinally of the connector 16 and intersect along the longitudinal axis of the connector as previously described herein. Also, the connector 16 illustrated in the modification of Fig. 12 is provided with surfaces 19 and 20 to fit adjacent the confronting parallel surfaces 21 and 22 formed by the paired projections 84, 85 and 86, 87 respectively.

As previously described, with regard to the modification of Fig. 1 of the drawings, suitable means in the form of a bolt 25 may be provided for fitting through the laterally extending slots 30 and 31 respectively in the projections 84, 85, 86 and 87 and through the longitudinally extending slot 18 of connector 16 whereby the members 3 and 4 of the coupling may be engaged together.

Particular attention is directed to the modification illustrated in Figs. 12 and 13 wherein the coupling members 3 and 4 are formed of the paired portions 80, 81 and 82 and 83 respectively so that such coupling members may be wedged in position in the members in which they are engaged. It is to be noted that a groove 88 is provided in one portion of each set, such groove being adjacent the base 89 of the U-shaped slot 11. A projection 90 depends from the other portion of the set and is adapted to seat within the groove 88 of the opposed portion. In this manner the paired portions of each set are pivotally connected together and such construction permits each paired set to be wedged tightly into position in the member in which the paired portions fit.

For example, as the bolt 25 and cooperating nut 27 are engaged as previously described so as to connect the members 3 and 4 and connector 16 together the rear end of portions 80 and 81 of the member 3 and the rear end of portions 82 and 83 of the member 4 will swing outwardly about the projections 90 as a pivot because of the arrangement of the groove and projection on the paired portions. This permits the outer end of the coupling members 3 and 4 to expand so as to wedge tightly within the members 91 and 92 in which they are arranged. This permits the coupling to be firmly positioned within an object having an irregular shape, such as a square member, rectangular member or a member having some other form of irregularly shaped interior.

If desired, the laterally extending openings 30 and 31 may be provided with outwardly diverging side surfaces as illustrated at 93 so that the bolt 25 may be inserted therethrough without bending thereof. Also, the projections 85 and 86 on portions 81 and 82 may be arranged slightly at an angle relative to the projections 84 and 87 on portions 80 and 83 as more clearly seen in Fig. 13 of the drawings so that as the bolt 25 is tightened, the portions 85 and 86 will move inwardly towards the connector 16 to a final seating position thereby causing the rear end of paired portions 80 and 81 and 82 and 83 to expand within the members 91 and 92 to wedge the coupling members 3 and 4 in position therein.

The manner of use of the modification illustrated in Figs. 12–15 inclusive, as well as the relationship between the coupling therein illustrated and described and the connector 16 and bolt 25 is similar as that described with regard to the modification illustrated in Fig. 1. The primary difference being that the coupling members 3 and 4 of the modification of Fig. 12 are formed of paired portions which are adapted to expand when the bolt 25 is secured between such paired portions and the connector fitting therebetween so as to wedge such portions tightly within the member in which each coupling member is positioned. The projections 84, 85, 86 and 87 may be integrally formed as a part of the portions 80, 81, 82 and 83 respectively, or if desired, the respective projections may be welded in position as a part of the respective portions 80, 81, 82 and 83.

As previously mentioned, the drawings serve to illustrate but a few of the innumerable combinations and arrangements which the present invention permits, and it should be readily obvious that the coupling members and their connectors may be fitted together in any desired relationship so as to position members secured therewith in any desired angular positional relation without departing from the scope of the present invention.

Although the coupling construction herein described provides an assembly that may be readily and easily connected together, the arrangement of the coupling and the relationship of the coupling members 3 and 4 to each other and to their connectors 16 is such as to provide a coupling which is strong and will withstand tremendous loads. It may be readily adaptable for use in structural purposes, although its use is not necessarily limited thereto and it may be used in any situation where it is desired to quickly and easily connect members in a predetermined position.

It is to be noted that the ends 76 of the connectors 16 may be rounded so as to accommodate positioning of the connectors relative to each other in certain situations such as illustrated by Fig. 11 of the drawings.

Broadly the present invention relates to a coupling and more particularly to a coupling which includes coupling members and a connector shaped whereby they may be easily and readily locked in any predetermined or desired angular relation.

This application is a continuation in part of my prior copending application Serial No. 481,290, filed on January 12, 1955, now abandoned and relating to an invention in Coupling.

What is claimed is:

A coupling for positioning structural members in any predetermined angular relationship comprising, members for engaging with the structural members, and means for positioning said engaging members together in any predetermined relationship, said means including, a pair of spaced ears on said engaging members forming a U-shaped slot in each of such members, there being a laterally extending slot in each of said ears, a connector fitting in said U-shaped slot for connecting said members together, and additional means for locking said connector and engaging members in such connected position, said last mentioned means including bolt means extending through said lateral ear slots and connector slots, and additional means for engagement with said bolt means to retain it in engagement with said ears and connector, said engaging members each comprising paired mating portions, there being a groove on one portion and a projection on the mating portion at the base of the U-shaped slot for positioning said portions together to form a member for pivotally connecting said paired ears together so that when said bolt means and engagement means are secured in position on said paired ears, said paired ears spread adjacent their rearward end to engage in the structural members in which they are positioned.

References Cited in the file of this patent

UNITED STATES PATENTS

| | | |
|---|---|---|
| 857,831 | Richards | June 25, 1907 |
| 1,541,674 | Wever | June 9, 1925 |
| 1,787,566 | Brown | Jan. 6, 1931 |
| 2,436,336 | Slater | Feb. 17, 1948 |
| 2,607,363 | Frey | Aug. 19, 1952 |
| 2,654,234 | Christensen | Oct. 6, 1953 |

FOREIGN PATENTS

| | | |
|---|---|---|
| 65,245 | Netherlands | Jan. 17, 1950 |